No. 706,875. Patented Aug. 12, 1902.
H. H. ALLEN.
ATTACHMENT FOR PLOWS OR THE LIKE.
(Application filed Feb. 4, 1902.)
(No Model.) 2 Sheets—Sheet 2.

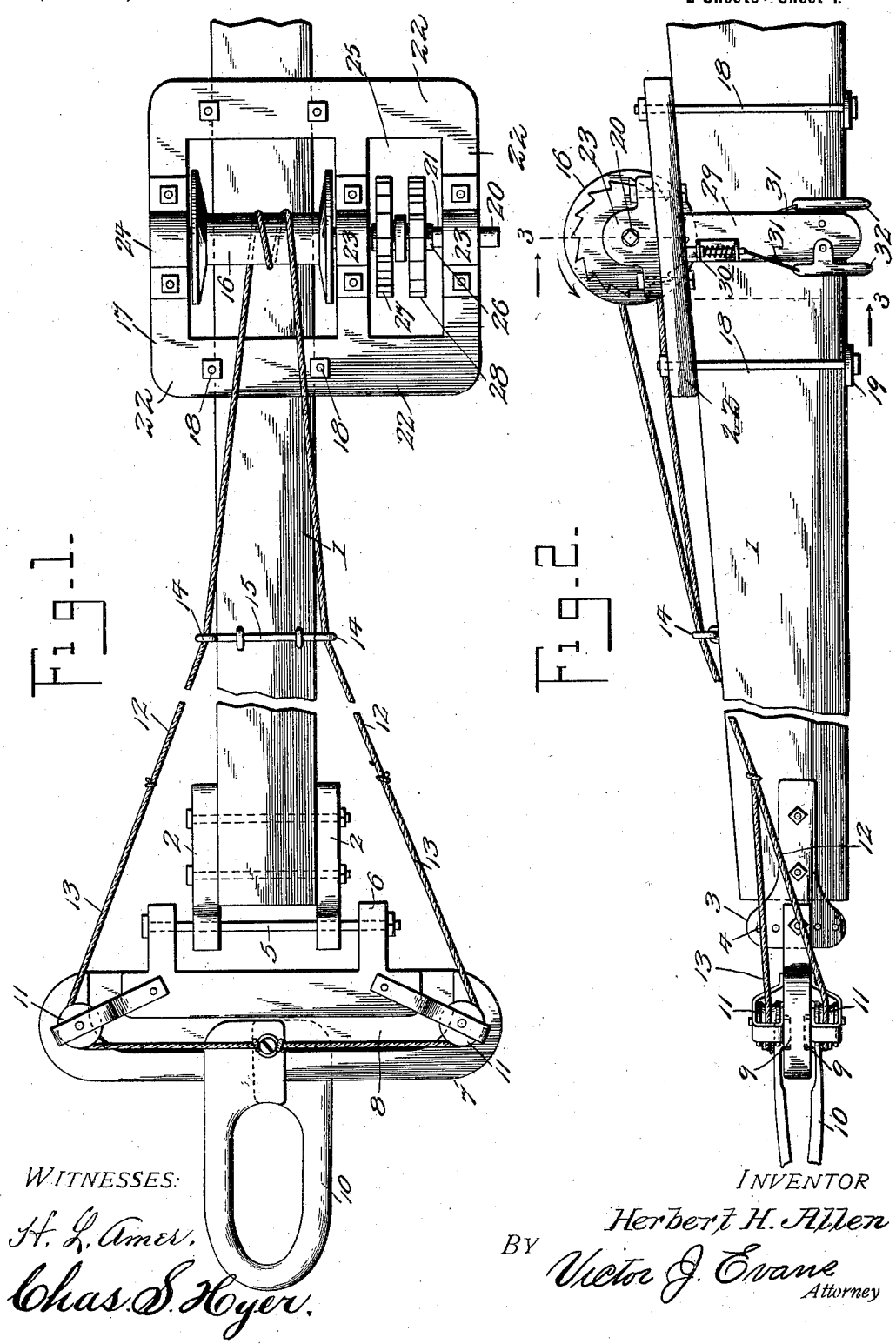

WITNESSES: INVENTOR
H. L. Amer. Herbert H. Allen
Chas S. Hyer BY Victor J. Evans.
Attorney

UNITED STATES PATENT OFFICE.

HERBERT H. ALLEN, OF CHICAGO, ILLINOIS.

ATTACHMENT FOR PLOWS OR THE LIKE.

SPECIFICATION forming part of Letters Patent No. 706,875, dated August 12, 1902.

Application filed February 4, 1902. Serial No. 92,588. (No model.)

*To all whom it may concern:*

Be it known that I, HERBERT H. ALLEN, a citizen of the United States, residing at Chicago, in the county of Cook and State of Illinois, have invented new and useful Improvements in Attachments for Plows or the Like, of which the following is a specification.

This invention relates to a draft attachment for plows and the like, more particularly adapted for connection to gang-plows, but applicable also for use with agricultural implements or machines and vehicles to allow the draft of animals to be adjusted laterally to accommodate the work to be done; and the object of the same is to provide a simple and effective form of shiftable clevis and devices for shifting said clevis whereby the plow may be made to cut a wide or narrow furrow or furrows of variable widths intermediate of the maximum and minimum adjustment of the clevis in opposite lateral directions.

The invention consists in the construction and arrangement of the several parts, which will be more fully hereinafter described and claimed.

Figure 3:
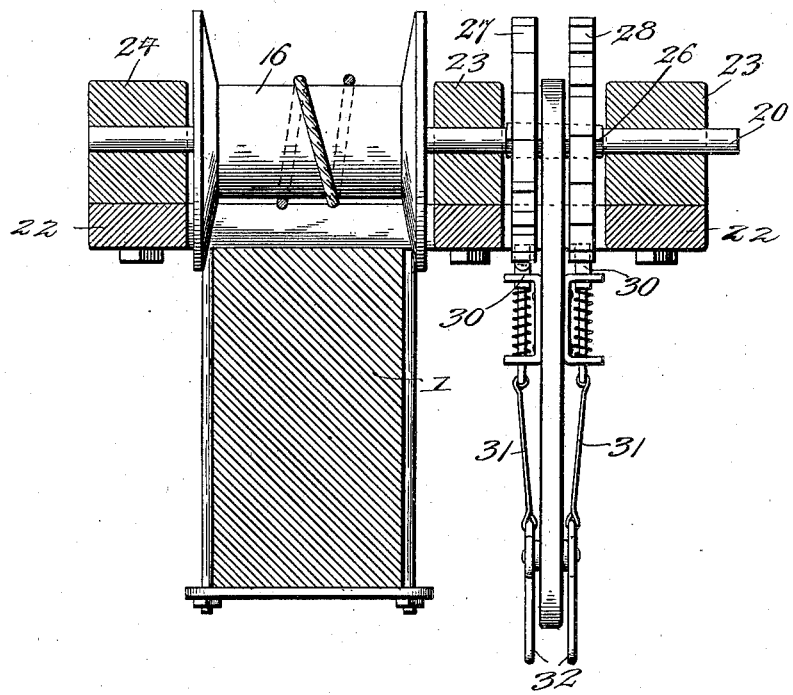
Figure 4:
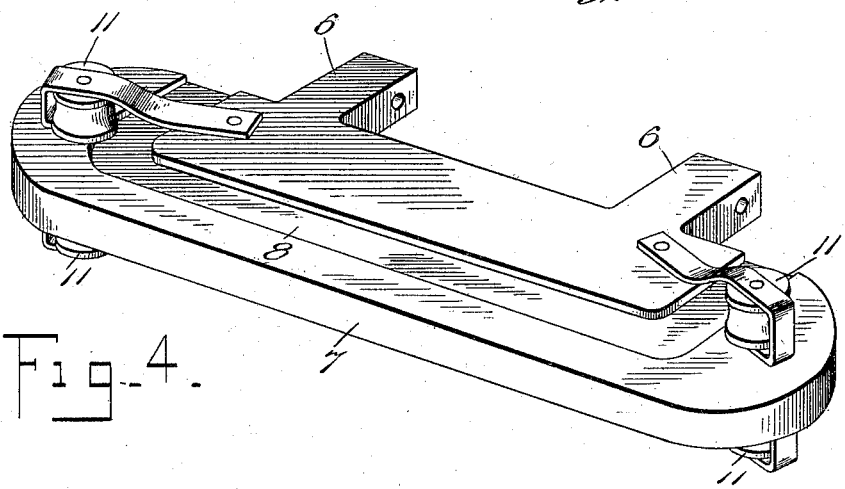

In the drawings, Figure 1 is a top plan view of a portion of a beam or tongue of a plow, cultivator, or the like embodying the features of the invention. Fig. 2 is a side elevation of the same. Fig. 3 is a transverse vertical section on the line 3 3, Fig. 2. Fig. 4 is a detail perspective view of a part of the improved attachment.

Similar numerals of reference are employed to indicate corresponding parts in the several views.

The numeral 1 designates the beam of a plow, cultivator, or the like having secured to the opposite sides of the front extremity thereof a pair of clips 2, with enlarged heads 3 projected in advance of the front end of the beam and extended in a vertical direction. These heads 3 have a series of vertically-alined openings 4 therein, which are in such relative positions as to transversely aline with each other to adjustably receive a connecting bolt or rod 5, which is terminally held in rearwardly-projecting arms 6 of a clevis-support 7. The bolt or rod 5 is nutted, so that it can be readily detached and shifted from one set of openings 4 to another of the same to vary the vertical elevation of the support 7 and thereby control the depth of cut or penetration of the plows or cultivators in connection with the beam 1. The bolt or rod 5 also forms a fulcrum for the support 7 to compensate for the movement of the draft attachments comprised in harness and avoid stiffness and consequent breakage of the support and parts in intimate relation thereto. The support 7 is formed with upper and lower channels or grooves 8, which are engaged by opposing lugs 9 on the rear terminals of a clevis 10. The one extremity of the clevis 10 passes over the upper side of the support 7, and the other extremity passes under the lower side of said support, and the lugs 9 have such normal projection toward each other that they will retain the said extremities of the clevis in engagement with the support; but said lugs are loose enough or have such size proportionate to the channels or grooves 8 as to permit the clevis to be shifted transversely in either direction. Adjacent to opposite terminals of the support 7 of the upper and lower sides are horizontally-disposed sheaves 11, and engaging the lower sheaves is a continuous cable or analogous device 12, which is attached to the extremity of the clevis at a point directly under the lug thereof. The upper sheaves 11 are engaged by a branch cable or other analogous loop 13, having its terminals attached to the cable 12 and also intermediately secured to the extremity of the clevis projecting over the upper portion of the support, as clearly shown by Fig. 1. The opposite portions of the cable or analogous device 12 movably extend in a rearward direction through the opposite eyes 14 of a guide-rod 15, secured on the upper side of the beam or tongue 1, and after passing through the eyes 14 to opposite portions of the cable 12 converge to and operatively surround upper and lower portions of a windlass or drum 16, having bearing at opposite ends in a frame 17, firmly held on the beam 1 by bolts 18, having their lower extremities engaging transversely-extending clip-bars 19, applied against the under side of said beam or tongue. In view of the mode of applying to opposite portions of the cable or analogous device 12 the windlass or drum 16, as clearly shown by Fig. 1, the rotation of said drum in one direction will cause the clevis 10 to be shifted toward one end of the support 7, one portion of the cable, as well as the loop 13, drawing in the direction of the movement of the clevis desired and the other portion of the cable and loop playing out or giving way to permit the shifting adjustment of said clevis. It will be understood that a reverse movement of the windlass or drum 16 will cause the clevis to move in an opposite direction on the support 7, and for operating the windlass or drum 16 a suitable crank-handle or other analogous device may at times be applied to the projecting terminal 20 of a shaft 21, secured to said windlass or drum. The frame 17 has a lateral extension 22, and the shaft 21 is projected thereover and has bearing in suitable boxes 23 and also in a box 24 at the opposite side of the frame. The extension 22 has an opening 25 therein to expose a portion of the shaft 21, which is squared, as at 26, between the boxes 23 and has two ratchet-wheels 27 and 28 thereon, with a swinging lever or arm 29 hung between the same and also engaging the squared portion of the shaft. This swinging lever or arm is the preferred means of operating the shaft to revolve the drum in opposite directions, and to lock said drum in its reverse movements to maintain a positive adjustment of the clevis 10 the teeth of the ratchet-wheels 27 and 28 project in reverse directions. The ratchet-wheel 28 is engaged by a spring-actuated dog 30, mounted on the outer side of the lever or arm 29, and the ratchet-wheel 27 is normally engaged by a similar dog disposed on the inner side of the said arm or lever. Both the dogs are connected by links 31 to the upper ends of releasing-levers 32, fulcrumed on the lower extremity of the lever or arm 29, and which are operative to release the dogs from the ratchet-wheel. When the clevis 10 is adjusted to the right, the windlass or drum 16 is rotated in the direction of the arrow shown by Fig. 2 by a step-by-step movement, the dog 30 having been first released from the ratchet 28, and during such movement of the windlass or drum the dog of the ratchet 27 plays over the latter. The windlass or drum is revolved by swinging the lever or arm 29, and in the reverse movement of the windlass or drum to shift the clevis 10 to the left the dog is released from the ratchet 27, and that in engagement with the ratchet 28 moves over the latter.

From the foregoing disclosure it will be seen that the clevis 10 can be adjusted to either a right or left position or held directly in the center in relation to the support 7, and a variation in the width of the furrow cut may be controlled at the will of the operator by a simple and effective operation.

Changes in the form, size, proportions, and minor details to suit different applications may be made without departing from the principle of the invention.

Having thus fully described the invention, what is claimed as new is—

1. The combination with a draft device, of a support attached to the front extremity thereof, a clevis laterally adjustable on the support, a windlass in rear of the latter, and a flexible connection between the windlass and the clevis, whereby said clevis may be shifted in opposite lateral directions.

2. The combination with a beam, of a support attached to the front extremity provided with upper and lower sheaves, a clevis shiftably engaging the said support, a windlass having means in connection therewith for locking it against movement when rotated in opposite directions, and a flexible connection between the windlass and the clevis and passing over the said sheaves.

3. The combination with a beam, of a support adjustably and movably attached to the front extremity thereof, a clevis shiftably engaging the said support, a windlass rotatable in opposite directions and having means for locking it against movement, a lever for rotating the windlass by a step-by-step movement, and a flexible connection between the windlass and the clevis.

4. The combination with a beam, of a support attached to the front extremity thereof and having channels in the upper and lower sides thereof, a clevis having the rear extremities engaging the said channels, a windlass in rear of said support, and flexible means extending from the windlass to the clevis for shifting the clevis.

5. The combination with a beam, of a support movably attached to the front extremity thereof and having channels in the upper and lower sides and upper and lower sheaves adjacent to opposite terminals, a clevis having rear locked extremities shiftably engaging the said channels, a reversely-rotatable windlass having locking and operating means, and a flexible connection between the windlass and the clevis, said connection engaging the sheaves on the support.

In testimony whereof I affix my signature in presence of two witnesses.

HERBERT H. ALLEN.

Witnesses:
RICHARD CURRAN,
EDWARD J. MCARDLE.